United States Patent
Sorani et al.

(10) Patent No.: US 10,754,666 B1
(45) Date of Patent: Aug. 25, 2020

(54) HARDWARE MICRO-SERVICES PLATFORM

(71) Applicant: RAD DATA COMMUNICATIONS LTD., Tel Aviv (IL)

(72) Inventors: Yzhak Sorani, Rishon LeZion (IL); Yaakov Stein, Jerusalem (IL)

(73) Assignee: Rad Data Communications Ltd., Tel Aviv (IL)

( * ) Notice: Subject to any disclaimer, the term of this patent is extended or adjusted under 35 U.S.C. 154(b) by 0 days.

(21) Appl. No.: 16/578,431

(22) Filed: Sep. 23, 2019

Related U.S. Application Data

(63) Continuation of application No. 16/524,213, filed on Jul. 29, 2019.

(51) Int. Cl.
  *G06F 9/445* (2018.01)
  *G06F 8/61* (2018.01)
(52) U.S. Cl.
  CPC ............ *G06F 9/44505* (2013.01); *G06F 8/61* (2013.01)
(58) Field of Classification Search
  CPC .......... G06F 9/44505; G06F 8/61; G06F 8/63; G06F 8/65; H03K 19/17756; H03K 19/17724; H03K 19/17736; H03K 19/17748; H03K 19/17752
  See application file for complete search history.

(56) References Cited

U.S. PATENT DOCUMENTS

| | | | |
|---|---|---|---|
| 7,382,154 B2 | 6/2008 | Ramos et al. | |
| 8,020,163 B2 | 9/2011 | Nollet et al. | |
| 8,364,946 B2 | 1/2013 | Ishebabi | |
| 8,368,423 B2 * | 2/2013 | Yancey | G06F 15/7867 326/38 |
| 9,436,623 B2 | 9/2016 | Wertheimer et al. | |

OTHER PUBLICATIONS

Luca Benini et al., Networks on Chips: A New SoC Paradigm, IEEE Computer, Jan. 2002, pp. 70-78.

* cited by examiner

*Primary Examiner* — Daniel D Chang
(74) *Attorney, Agent, or Firm* — A.C. Entis-IP Ltd.; Allan C. Entis; Kenichi N. Hartman

(57) ABSTRACT

A device comprising: at least one partially reconfigurable FPGA; a Network-on-Chip (NoC) comprised in the FPGA; and at least one area on the at least one FPGA operable to house a hardware micro-service (HMS); wherein an HMS image may be loaded onto the area of the at least one FPGA via partial reconfiguration to form a new HMS, and the NoC is operable to forward information to and from the new HMS without the NoC being reloaded.

17 Claims, 7 Drawing Sheets

| address of micro-service 2 | address of micro-service 3 | address of micro-service 4 | address of micro-service 5 | address of output port |
|---|---|---|---|---|

Fig. 2B

| address of micro-service 1 | address of micro-service 2 | address of micro-service 3 | address of micro-service 4 | address of micro-service 5 | address of output port |
|---|---|---|---|---|---|

Fig. 2A

HARDWARE MICRO-SERVICES PLATFORM

RELATED APPLICATIONS

The present application is a continuation of U.S. application Ser. No. 16/524,213 filed on Jul. 29, 2019, the disclosure of which is incorporated herein by reference.

FIELD

The present disclosure relates to a computational platform with reconfigurable hardware micro-services. More specifically, to the use of a partially reconfigurable FPGA and networking-on-chip architecture to provide such a platform

BACKGROUND

The advantages of constructing complex software applications from loosely coupled lightweight micro-services have been recognized for some time. Software micro-services ("SMSs") as known in the art are typically defined as standalone software implementations of a function that are equipped with a standardized interface, and can be stored in a repository to be retrieved, installed and run on demand SMSs may be implemented as containers, virtual machines (VMs), or bare metal machines. An application may be constructed by "chaining" together a plurality of SMSs in a particular order. Micro-services speed software development, by enabling small teams to develop nontrivial standalone functionalities, by enabling extensive re-use, by facilitating code refactoring, and encouraging DevOps-style incremental build and test practices.

The chaining of SMSs may be accomplished using standard mechanisms from computer networking. For example, the output of one SMS may be formatted as an Internet Protocol (IP) packet, and this packet may be forwarded to a second SMS to serve as its input.

SUMMARY

It would be beneficial to adopt the concepts of micro-services and their chaining to hardware programmable logic blocks comprised within FPGAs, because FPGAs can be used to accelerate computationally intensive tasks, such as, hash calculation, deep packet inspection, and machine learning. There is therefore provided herein embodiments of a hardware logic block comprised within an FPGA that is operable to implement a fine-grained yet self-contained computational function, wherein the hardware logic block can be chained with other hardware logic blocks or SMSs to quickly and flexibly configure specialized computation equipment on an as-needed basis.

For convenience of presentation, an FPGA hardware logic block in accordance with an embodiment of the disclosure may be referred to herein as a "hardware micro-service" or "HMS".

The present disclosure also provides embodiments of an FPGA comprising a general-purpose Network on Chip ("GP-NoC") and one or more HMSs operatively connected to the GP-NoC. In an embodiment of the disclosure, a GP-NoC comprises a packet forwarding device that is operable to route information packets to a given HMS responsive to one or a combination of: a field or fields comprised in the information packet and a forwarding table or tables stored on-chip or in external memory. Optionally, the packet forwarding device is selected from the group consisting of: an Ethernet switch, an IP router, and an MPLS Label Switched Router (LSR).

For convenience of presentation, an FPGA in accordance with an embodiment of the disclosure comprising one or more HMSs is referred to herein as an HMS-FPGA.

In an embodiment, an HMS-FPGA is operable to load a new HMS via partial reconfiguration. Optionally, previously programmed portions of the HMS-FPGA remain intact and functioning during and after loading of the new HMS. In an embodiment, an HMS-FPGA is operatively connected to an HMS image repository, and the HMS-FPGA is configured to load a new HMS responsive to one of a plurality of HMS images stored in the HMS image repository.

In an embodiment, a GP-NoC comprised in an HMS-FPGA is operable to perform HMS "chaining", that is, connecting a plurality of HMSs in a specified order to enable processing of an information packet, such that the specified order defines an application. An application defined by a particular order of micro-services may also be referred to herein as a "macro-service". Optionally, the GP-NoC is operable to perform chaining of HMSs responsive to chaining data that defines an order of micro-services corresponding to a given application. The chaining data optionally comprises data encoded in an information packet to be processed by the HMS-FPGA and or a forwarding table programmed into the GP-NoC.

The present disclosure also provides embodiments of an orchestration system that instantiates a desired macro-service. In an embodiment, an orchestration system is configured to select HMSs and/or SMSs required to instantiate a desired macro-service, install HMS images not already installed on the FPGA via partial reconfiguration, and to configure the GP-NoC to correctly chain together the required micro-services.

The present disclosure also provides embodiments of an application instantiation process that may be executed by an orchestration system in accordance with an embodiment of the disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. presentation and are not necessarily shown to scale.

Dimensions of features shown in the figures are chosen for convenience and clarity of presentation.

FIGS. 2A-2B schematically illustrates meta-information associated with an information packet being routed by an address stack, according to an embodiment of the present disclosure.

DETAILED DESCRIPTION

Descriptions of embodiments are provided by way of example and are not intended to limit the scope of the disclosure. The described embodiments comprise different features, not all of which are required in all embodiments of the disclosure. Some embodiments utilize only some of the features or possible combinations of the features. Variations of embodiments of the disclosure that are described, and embodiments of the disclosure comprising different combinations of features noted in the described embodiments, will occur to persons of the art. The scope of the disclosure is limited only by the claims.

Figure 1:
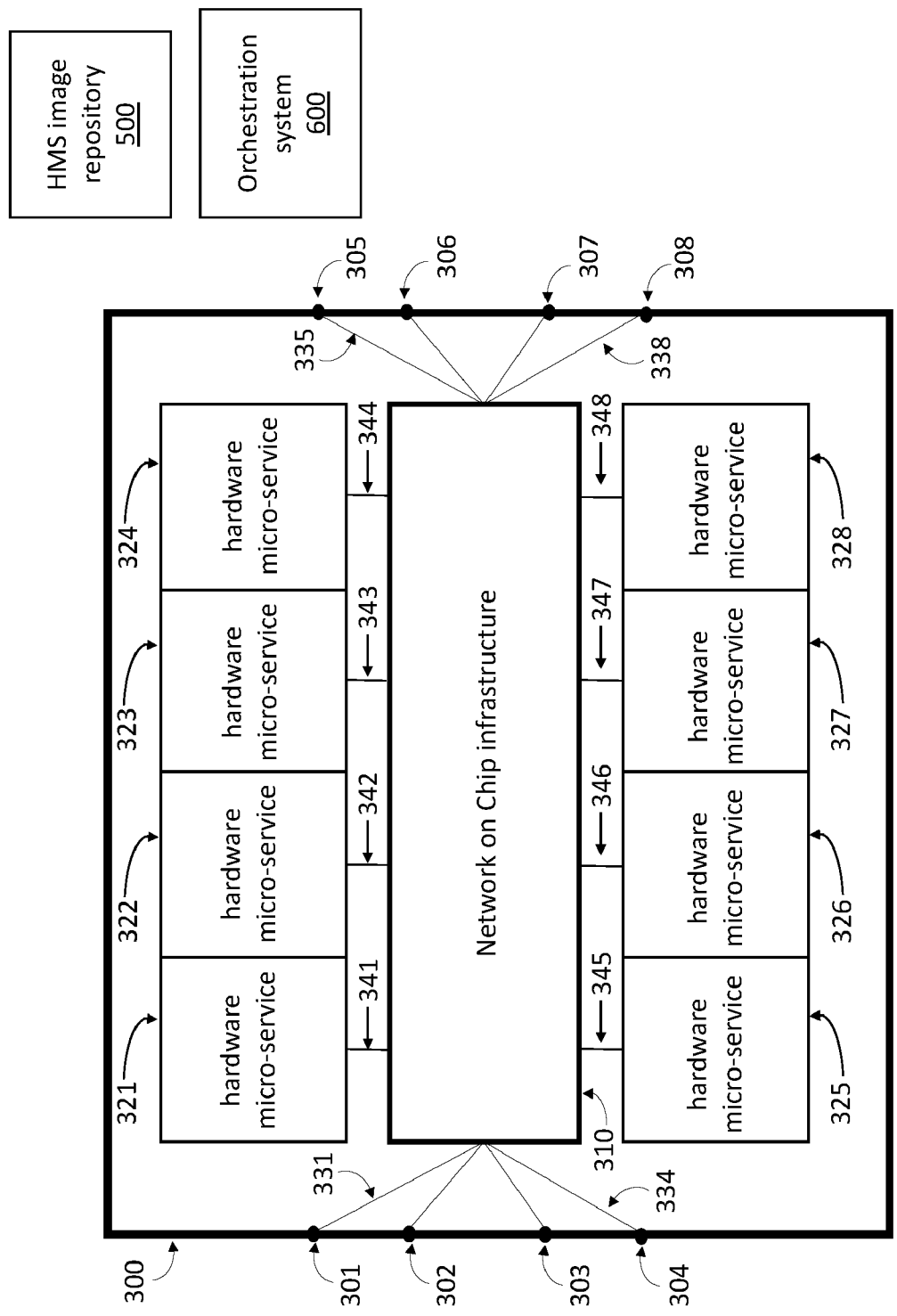
FIG. 1 schematically illustrates an HMS-FPGA according to an embodiment of the present disclosure.

FIG. 1 schematically depicts an HMS-FPGA 300 according to an embodiment of the present disclosure, comprising a GP-NoC infrastructure 310. The GP-NOC is illustratively depicted with a thick border, indicating that it is pre-loaded, in contrast to the HMSs (321 through 328), which are depicted with thin borders schematically indicating that they may be loaded on demand, without impacting running applications. For illustrative purposes the hardware micro-services are all depicted as occupying regions within a same area on the FPGA, but this is not a limitation of the present disclosure. Optionally, the HMS-FPGA is provided with the NoC statically pre-installed, thus obviating the need to preload the NoC before loading any HMSs. Such static pre-installation may be referred to as "hardening", and the resulting GP-NoC may be referred to as a "hard-GP-NoC". An HMS-FPGA 300 comprising a hard-GP-NoC as GP-NoC 310 is a hybrid between FPGA and Application Specific Integrated Circuit (ASIC) technologies, and GP-NoC 310 would not be capable of being subsequently removed or re-installed via partial reconfiguration.

Figure 3:
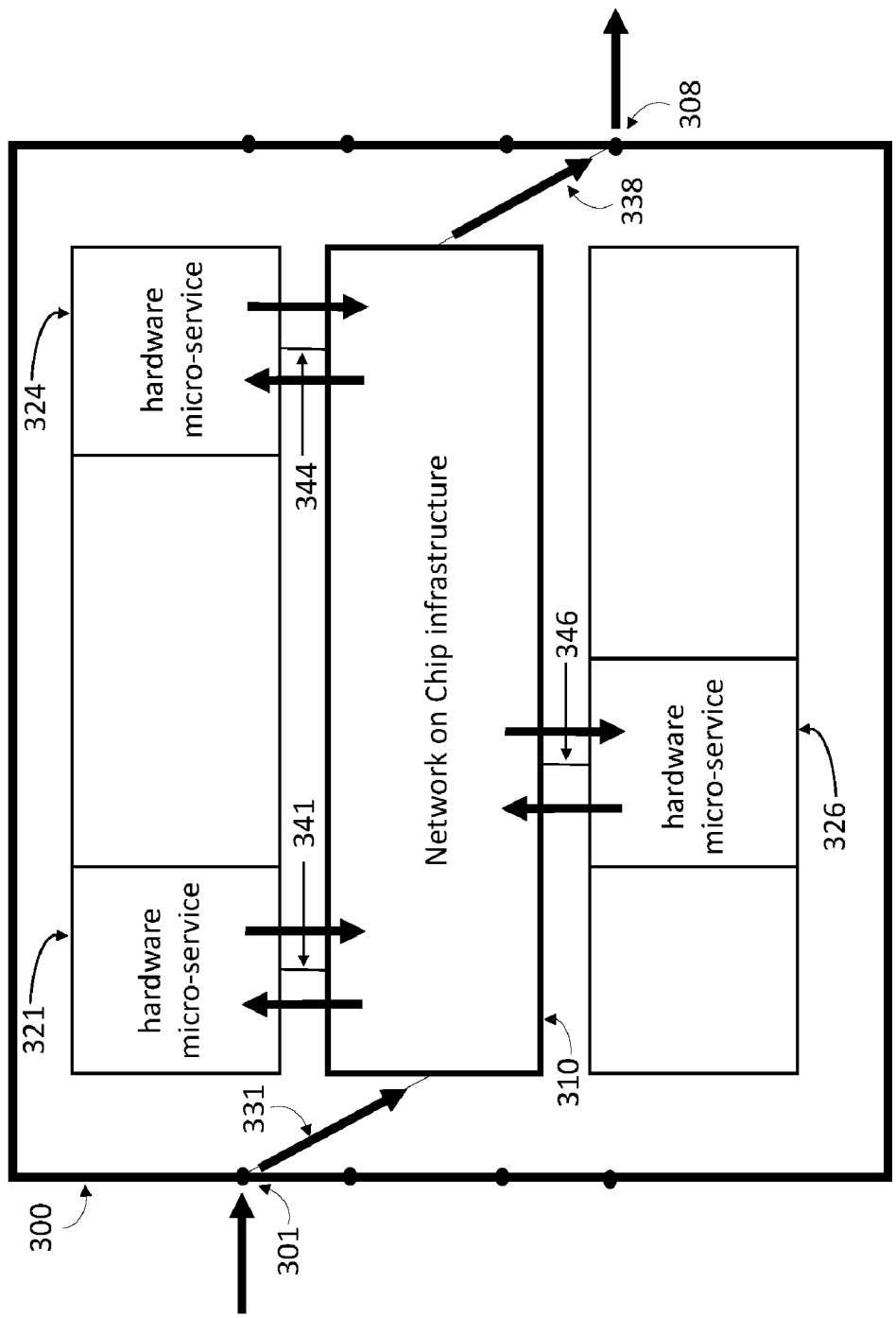
FIG. 3 schematically illustrates an HMS-FPGA according to an embodiment of the present disclosure, running a single application implemented by the NoC.

The GP-NoC is configured to be able to receive information to be processed from any number of predetermined input pins, by way of example four input pins, 301, 302, 303, and 304 as depicted in FIG. 3. Each of these input pins is connected to the GP-NoC infrastructure via a separate connecting line (331 through 334, respectively). The GP-NoC may furthermore output processed information from any number of predetermined output pins, by way of example four output pins, 305, 306, 307, and 308 as depicted in FIG. 3. Each of these output pins is connected to GP-NoC 300 via a separate connecting line (335 through 338, respectively). Each HMS depicted in FIG. 3 as being connected to the NoC via a bidirectional line (341 through 348).

Each HMS (321 through 328) may be loaded via partial reconfiguration of the HMS-FPGA and is equipped with a standardized interface towards the GP-NoC. Optionally, GP-NoC 310 comprises a packet forwarding device that is operable to direct an information packet to a given HMS responsive to a field comprised in the information packet and a forwarding table optionally stored in a memory (not shown) comprised in the GP-NoC. Optionally, the packet forwarding device is selected from the group consisting of: an Ethernet switch, an IP router, and an MPLS Label Switched Router (LSR). Depending on the packet forwarding device employed in the GP-NoC, information packets may be formatted as Ethernet frames (for an Ethernet switch), IP packets (for an IP router), or MPLS packets (for an LSR), respectively.

GP-NoC 310 may be configured such that when a new HMS is loaded onto the HMS-FPGA, the GP-NoC is capable of forwarding information packets to the new HMS without being reinstalled via partial reconfiguration. Rather, packets may be directed to the newly loaded HMS as needed responsive to the forwarding table of the GP-NoC being updated with appropriate chaining data and/or subsequent information packets encoding appropriate chaining data.

HMS-FPGA 300 may be operably connected to an HMS image repository 500 storing a plurality of HMS images (not shown), each HMS image being a digital representation of an HMS that may be installed onto a target FPGA via partial reconfiguration. An HMS-FPGA may be partially reconfigured on demand to add a new HMS.

HMS-FPGA 300 may be operably connected to an orchestration system 600, which is operable to select HMS images for installation on the HMS-FPGA, to initiate installation of new HMSs based on the selected HMS images via partial reconfiguration, and to provide chaining data for in order to instantiate a desired application in which information packets are process by a sequence of micro-services that includes the new HMSs, as defined by the chaining data. Providing chaining data optionally includes updating a forwarding table for GP-NoC 310 comprised in HMS-FPGA 300 and/or specifying labels or addresses to be inserted into information packets prior to being sent to the HMS-FPGA.

Applications instantiated by orchestration system 600 and HMS-FPGA can be used in many different contexts. By way of an example, we may consider a complex computational task, such as Bitcoin mining. Proof-of-work (PoW) block-chain computations are purposely complex, and hence efficient Bitcoin mining typically requires dedicated mining hardware. In an embodiment of the disclosure, a PoW block-chain computation device may be decomposed into a set of "blockchain" HMSs of various granularities (e.g., Merkle tree construction, SHA-256 hash computation, difficulty calculation, etc.). In an embodiment of the disclosure, a set of blockchain HMSs may be loaded onto one or more HMS-FPGAs and instantiated as an application with the blockchains HMSs interconnected by appropriate chaining data so that the application functions as a PoW block-chain computation device.

As another example, we may consider a networking appliance, such as an Ethernet switch, an IP router, network address translation unit, or a firewall. In order to operate a wire-speed for high data rates, these appliances are typically at least partially implemented in hardware. In an embodiment of the disclosure, a networking appliance may be decomposed into "networking" HMSs of various granularities (for example, field extraction, longest prefix match, exact match, table lookup, etc.). In an embodiment of the disclosure, a set of networking HMSs may be loaded onto one or more HMS-FPGAs and instantiated as an application with the networking HMSs interconnected by appropriate chaining data so that the application functions as a networking appliance.

Chaining of the HMSs by the GP-NoC is optionally implemented by one or more of the following three packet-forwarding mechanisms described hereinbelow.

In a first packet-forwarding mechanism, each information packet being forwarded by the GP-NoC is marked by a unique macro-service label designating the collection of HMSs and the order of HMSs by which the information packet is required to be processed. The GP-NoC forwards an information packet responsive solely to the macro-service label and to an input identifier (i.e., the input pin, or the address of the hardware micro-service that has sent the information packet to the GP-NOC). In a case where the NoC comprises an Ethernet switch, the application label may be a VLAN tag. In a case where the GP-NoC is an IPv6 router, the label may be a Traffic Class (TC) field.

A GP-NoC 310 may be programmed, by way of example with a forwarding table, to map a next hop address for a given information packet responsive to the packet's application label and input address. An example of a forwarding table is shown in table 1:

TABLE 1

|  | Application label: "AA" | Application label: "AB" |
| --- | --- | --- |
| Input address: input pin 301 | HMS 321 | HMS 323 |
| Input address: HMS 321 | HMS 323 | Output pin 310 |
| Input address: HMS 323 | Output pin 308 | HMS 328 |
| Input address: HMS 328 | N/A | HMS 321 |

According to the forwarding table of the GP-NoC shown in table 1, a packet having application label AA received by the HMS-FPGA from input pin 301 would be forwarded by the GP-NoC to HMS 321, then to HMS 323, and then exit the HMS-FPGA via output pin 308. By contrast, a packet having application label AB would be processed differently in the HMS-FGPA: the packet would be forwarded from input pin 301 to HMS 323, then to HMS 328, then to HMS 321, and then exit the HMS-FPGA via output pin 310.

Optionally, the GP-NoC may be programmed to forward an information packet to more than one HMS, by way of example when parallel processing is required by the application or to enable acceleration of the processing. Optionally, the GP-NoC may be programmed to forward an information packet to one of several distinct HMSs, by way of example when an HMS-FPGA comprises multiple instances of a same HMS, and the GP-NoC is programmed to anycast the packet responsive to a current load of the HMS instances.

It will be appreciated that the first packet-forwarding mechanism suffers from a limitation that a single HMS may not appear more than once in the same macro-service chain.

In a second packet-forwarding mechanism, a packet being forwarded by the GP-NoC comprises an address stack, and a GP-NoC operation on the packet comprises forwarding the packet to the address indicated by the top address of the address stack, as well as popping the top address from the address stack so that the next address in the address stack is converted into a new top address. By way of example, in a case where the GP-NoC comprises an MPLS LSR, the address stack may be a MPLS label stack. In a case where the GP-NoC comprises an IPv6 router, the address stack may be a sequence of IPv6 headers such as defined by IPv6 segment routing.

It will be appreciated that the second packet-forwarding mechanism leads to an information packet itself programming the NoC. Macro-services need not be preprogrammed by installation of macro-service-specific forwarding tables in the GP-NOC; rather an information packet may be processed by the sequence of HMSs represented in an address stack comprised in the packet.

It will be apparent that, in a case where the second packet-forwarding mechanism is employed, it is possible for the same HMS to operate on the information packet more than once by repeating its address in the stack.

FIG. 2A schematically depicts an address stack added to an information packets according to this embodiment, before processing by the micro-service having an address schematically shown as address 1. FIG. 2B schematically depicts the same address stack shown in FIG. 2A after being processing by the micro-service having the address schematically shown as address 1, so that the address of the micro-service that has already performed its processing has been popped from the stack.

A shortcoming of the first two packet-forwarding mechanisms is that they are not able to support forwarding behavior influenced by the result of processing. For example, consider a Deep Packet Inspection (DPI) micro-service utilized by a firewall application: it would be desirable to forward the network packet to a micro-service that specializes in uniquely identifying a particular threat in a given network packet if, and only if, the DPI micro-service discovers a particular suspect signature in the network packet.

In a third packet-forwarding mechanism, each information packet being forwarded by a GP-NoC is marked at each stage in the chain by a next HMS identifier. Optionally this next HMS identifier is its address. Optionally this next HMS identifier is a logical identifier which may be mapped to an HMS or HMSs by the GP-NOC. The GP-NoC is programmed to map the next HMS identifier to a corresponding HMS or output pin and forwards the packet accordingly. In this third packet-forwarding mechanism, an HMS is operable to change the next HMS identifier of an information packet responsive to the result of processing performed on the information packet. As such, the HMS may process the information packet, decide on the next HMS in the chain, swap the next HMS identifier of the information packet with a new next HMS identifier, and forward the information packet back to the GP-NoC. The GP-NOC then forwards the information packet to the next HMS responsive to the next HMS identifier. The final HMS in the chain swaps in an identifier indicating an output pin of the HMS-FPGA.

When utilizing embodiments of the current disclosure to implement a network appliance (e.g., an Ethernet switch, an IP router, or a firewall) the information packets forwarded by the NoC infrastructure may or may not be identical to the network packets being forwarded by the network appliance. One reason is that the hardware micro-services may add metadata to the network packet, which is removed at the end of the micro-service chain. For example, a DPI micro-service may append a packet classification identifier for use by subsequent micro-services. A second reason is that it may not be necessary to forward the entire packet to all micro-services. Software packet forwarding devices do not typically forward the entire network packet between different modules, but rather preserve the network packet in buffer memory (perhaps even on the network interface card) and forward descriptors containing a pointer to the packet in memory. In embodiments of the disclosure, the information packet being forwarded by the GP-NoC may be the entire packet, or only the packet headers (e.g., the first 128 bytes of the packet), or any other abbreviated form of the network packet sufficient for the computation being performed.

FIG. 3 schematically shows FPGA (300), running a single application implemented by NoC (310) chaining together three hardware micro-services 321, 324, and 326, optionally by implementing a first, second, or third packet forwarding mechanism as described hereinabove. As shown in FIG. 3, an information packet, schematically indicated as a filled block arrow, appears at input pin 301, flows over connecting line 331 to the NoC, is routed by the NoC through a chain of hardware micro-services 321, 324, and 326 utilizing connecting lines 341, 344, and 346 respectively, and exits the FPGA via connecting line 338 and output pin 308. Other areas on the FPGA are either occupied by hardware micro-services not used by this application, or are unoccupied.

Figure 4:
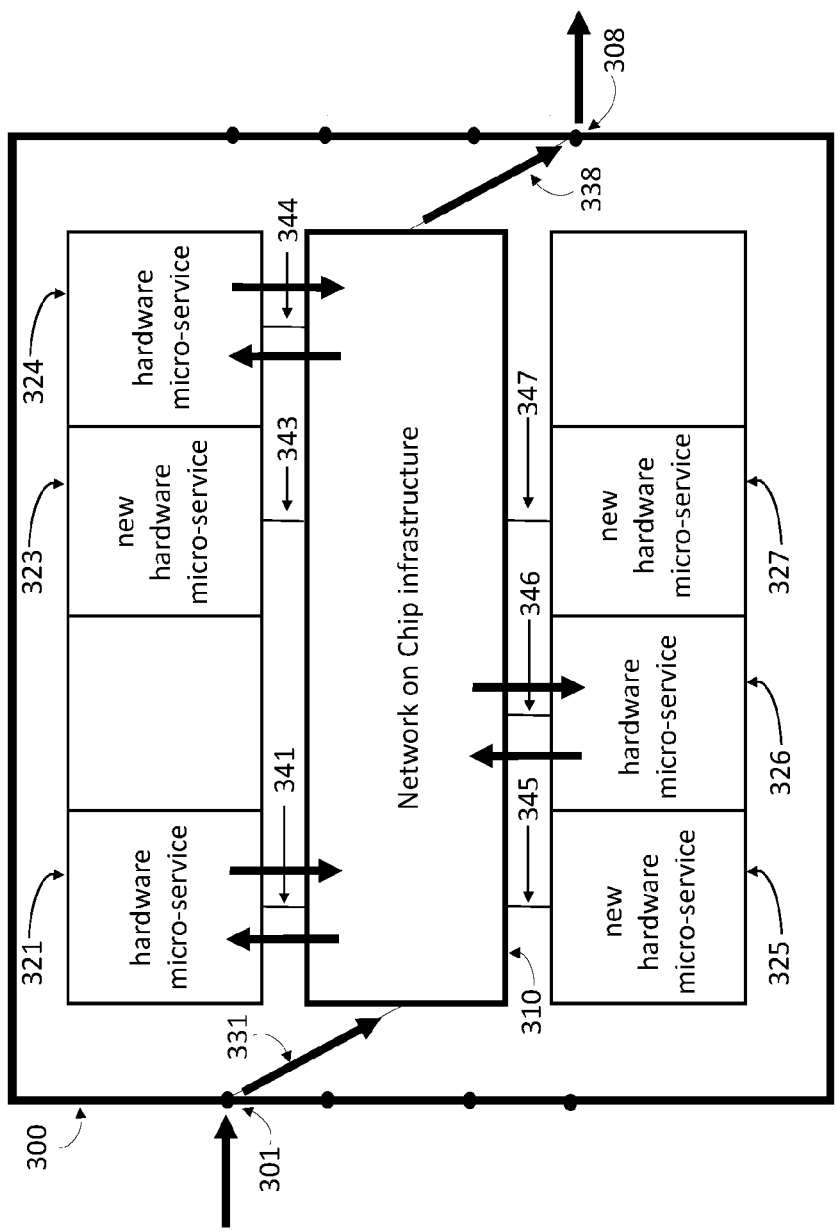
FIG. 4 schematically illustrates an FPGA according to an embodiment of the present disclosure, running a first application while loading new HMSs.

FIG. 4 depicts HMS-FPGA 300 that is running the first application as in the previous figure, while simultaneously being partially reconfigured to newly load HMSs 323, 325, and 327 onto free areas of the HMS-FPGA, to allow the HMS-FPGA to implement a second application that make use of the newly loaded HMSs. As shown in FIG. 4, loading HMSs 323, 325, and 327 additionally comprises connecting the new HMSs to GP-NoC 310 by means of bidirectional connecting lines 343, 345, and 347, respectively.

In conjunction with the loading of new HMSs 323, 325, and 327, GP-NoC 310 may be programmed to provide the forwarding table with addresses corresponding to the newly loaded HMSs. Additionally or alternatively, a function-to-address map for HMS-FPGA 310 that is stored in orchestration system 600 may be updated to accommodate the newly loaded HMSs. It will be appreciated that the updating of the GP-NoC to accommodate the newly loaded HMSs can thus be accomplished without partial reconfiguration of the HMS-FPGA to provide a new GP-NoC.

Figure 5:
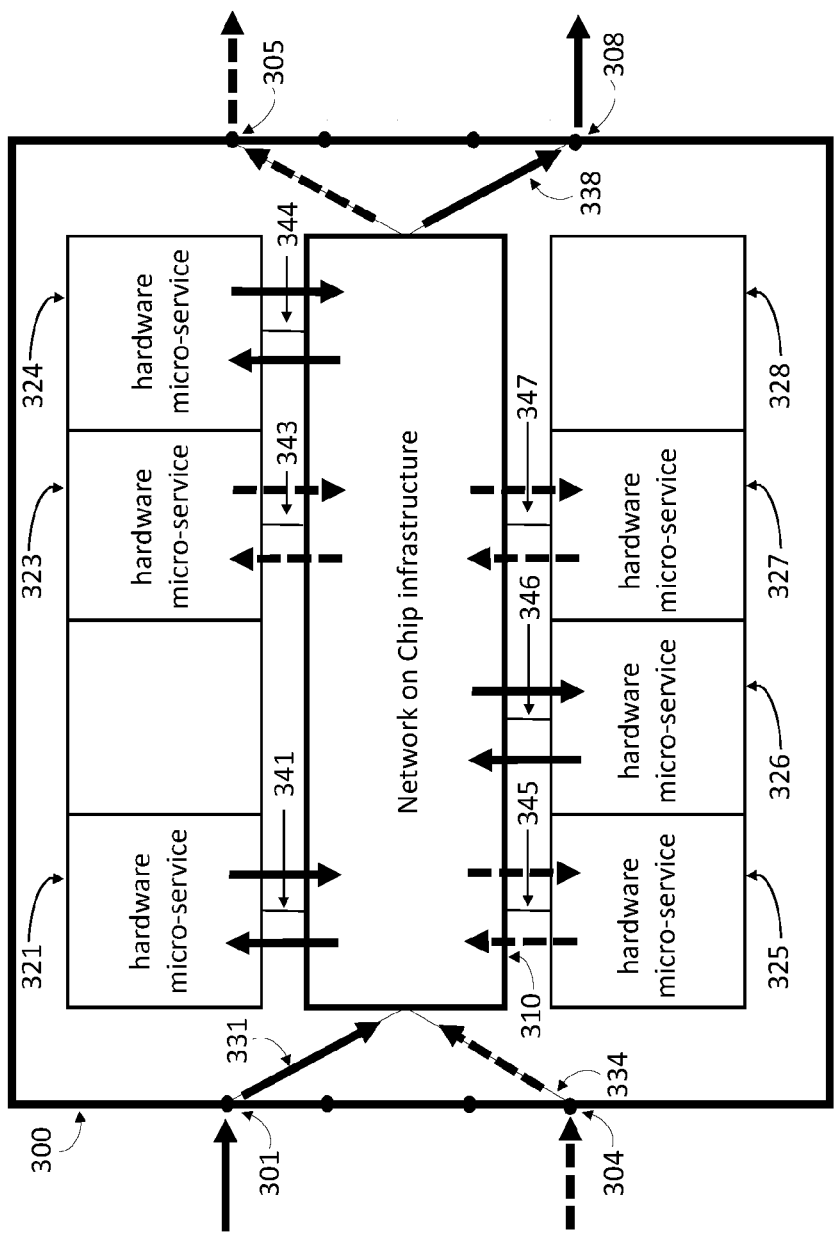
FIG. 5 schematically illustrates an FPGA according to an embodiment of the present disclosure, running a first application and a second application.

FIG. 5 depicts an FPGA (300) according to an embodiment of the present disclosure, simultaneously running the first application as well as the second application in parallel. GP-NoC 310, optionally implementing the first, second, or third packet-forwarding mechanisms disclosed herein above, routes information packets for the second application from input port 304, through a chain of three hardware micro-services 325, 323, and 327 (in that order), and then out of HMS-FPGA 310 via output port 308. The information packet being routed for the second application is schematically indicated as dashed lines in order to differentiate it from the information packet for the first application, which is schematically indicated as filled arrows. The lack of overlap between hardware micro-services used by the first and second applications is for illustration only, and is not a limitation of the current disclosure. By way of example, HMS-FPGA may be used to implement a third application that makes use of HMS 321 that is used for the first application and HMS 325 that is used for the second application.

Whereas the foregoing discussion with respect to FIGS. 1-5 has assumed that all micro-services in a micro-services chain for an application involving processing by HMS-FPGAs are HMSs, it is in certain cases advantageous to for a given application to make use of SMSs together with HMSs.

There is provided as an aspect of embodiments of the disclosure, micro-service chains that comprise both software and hardware micro-services. Aspects of the disclosure also provide methods of implementing an application with an HMS-FPGA in which at least one micro-service is an HMS comprised in the HMS-FPGA and at least one micro-service is a SMS that is run outside of the HMS-FPGA. A micro-service chain comprising at least one SMS and at least one HMS may be referred to herein as a "hybrid micro-service chain". A hybrid micro-service chain is optionally implemented with a first, second, or third packet-forwarding mechanism as described herein above.

It may be the case that a single FPGA does not suffice to contain the plurality of HMSs required for all the required macro-services. In such cases HMSs may be installed on more than on HMS-FPGA, and a single macro-service may require chaining between two or more HMS-FPGAs. In such cases efficiency requires minimizing the number of transitions from FPGA to FPGA.

Figure 6:
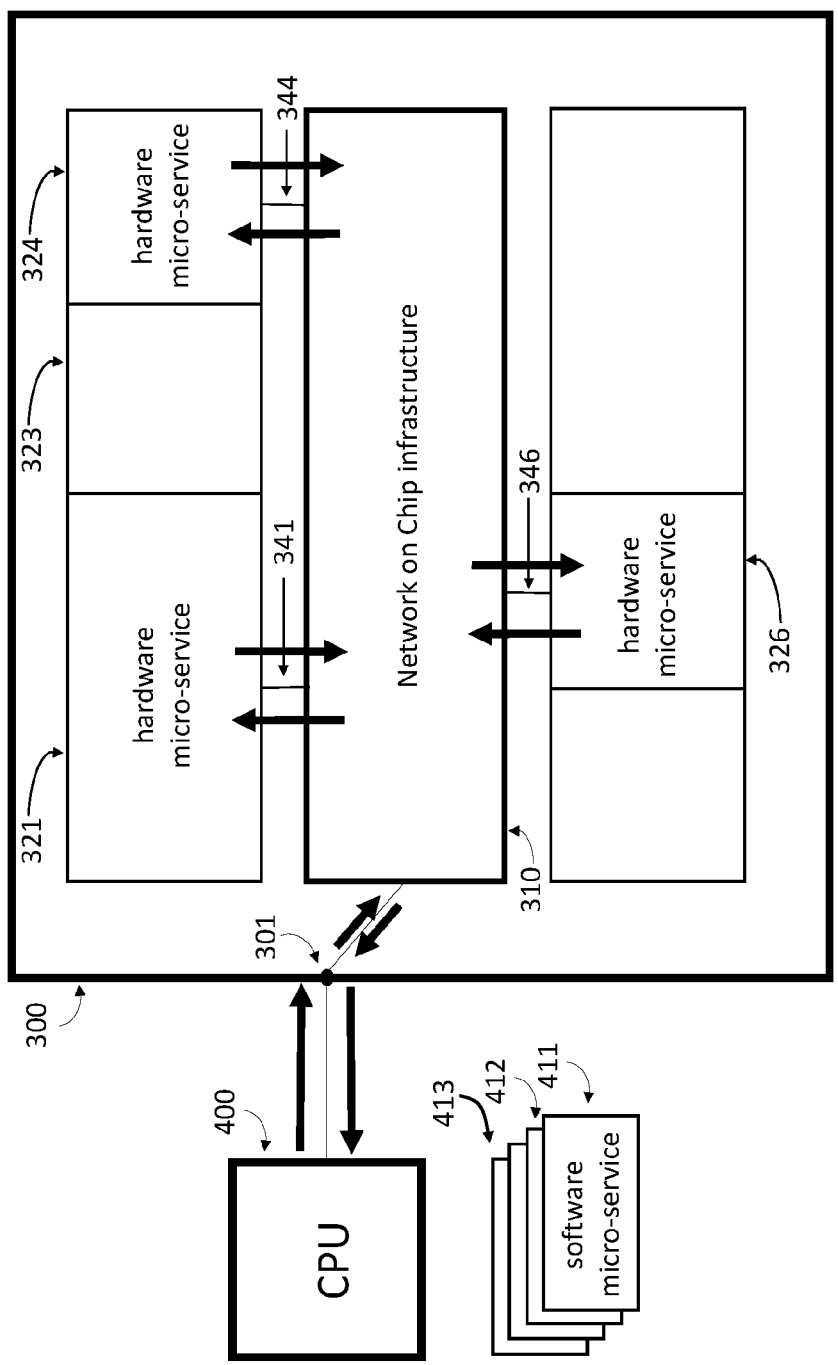
FIG. 6 schematically illustrates implementing an application by a chain of hardware and software micro-services using an HMS-FPGA according to an embodiment of the present disclosure.

FIG. 6 schematically depicts implementation of an application by a chain of hardware and software micro-services. HMS-FPGA 300 is connected to a CPU 400 that hosts a collection of SMSs, including SMSs 411 and 412. The CPU is connected to the HMS-FPGA via input/output pin 301 (in an HMS-FPGA that does not support bidirectional pins, then two pins, an output pin and an input pin, are used). Information originating in the CPU appears at input/output pin 301, flows over connecting line 331 to GP-NoC 310, and is routed by GP-NoC to HMS 321 over bidirectional line 341. The output of HMS 321 is sent by the NoC back to CPU 400 (once again traversing input/output pin 301) for processing by SMS 411. Once processed, the information re-enters HMS-FPGA 300 via pin 301 and routed by the NoC to HMS 324. The output of this hardware micro-service is sent by the NoC back to the CPU (once again traversing input/output pin 301) for processing by SMS 412. Once processed, the information re-enters the HMS-FPGA as before and is routed by the NoC to HMS 326. Finally, the processed information exits the HMS-FPGA for the last time via pin 30 land may be subject to further processing by CPU 400.

In an embodiment of the present disclosure, a given micro-service may be available in both software and hardware versions, and orchestration system 600 may be operable to select either the hardware or software version based on computational resource availability. By way of example, if the computational resource availability of HMS-FPGA 300 is below a predetermined threshold, the orchestration system may configure an information packet that may have otherwise been directed to be processed by HMS 321 to be instead processed by a SMS 413 that runs in CPU 400, which performs the same computation function as HMS 321. Additionally or alternatively, orchestration system 600 may be operable to select either the hardware or software version of a micro-service based on computational requirements of the application. By way of example, an HMS in an HMS-FPGA would be expected to perform its computational tasks at a faster rate than a SMS that performs the same computation tasks through a CPU. An orchestration system may therefore be configured to direct an information packet to be processed by a hardware version of a micro-service over the software version if a given application requires a certain minimum computational rate. The orchestration system may additionally minimize the number of transitions from FPGA to CPU and back. If multiple HMS-FPGAs are used, the orchestration system may minimize transitions between FPGAs.

Figure 7:
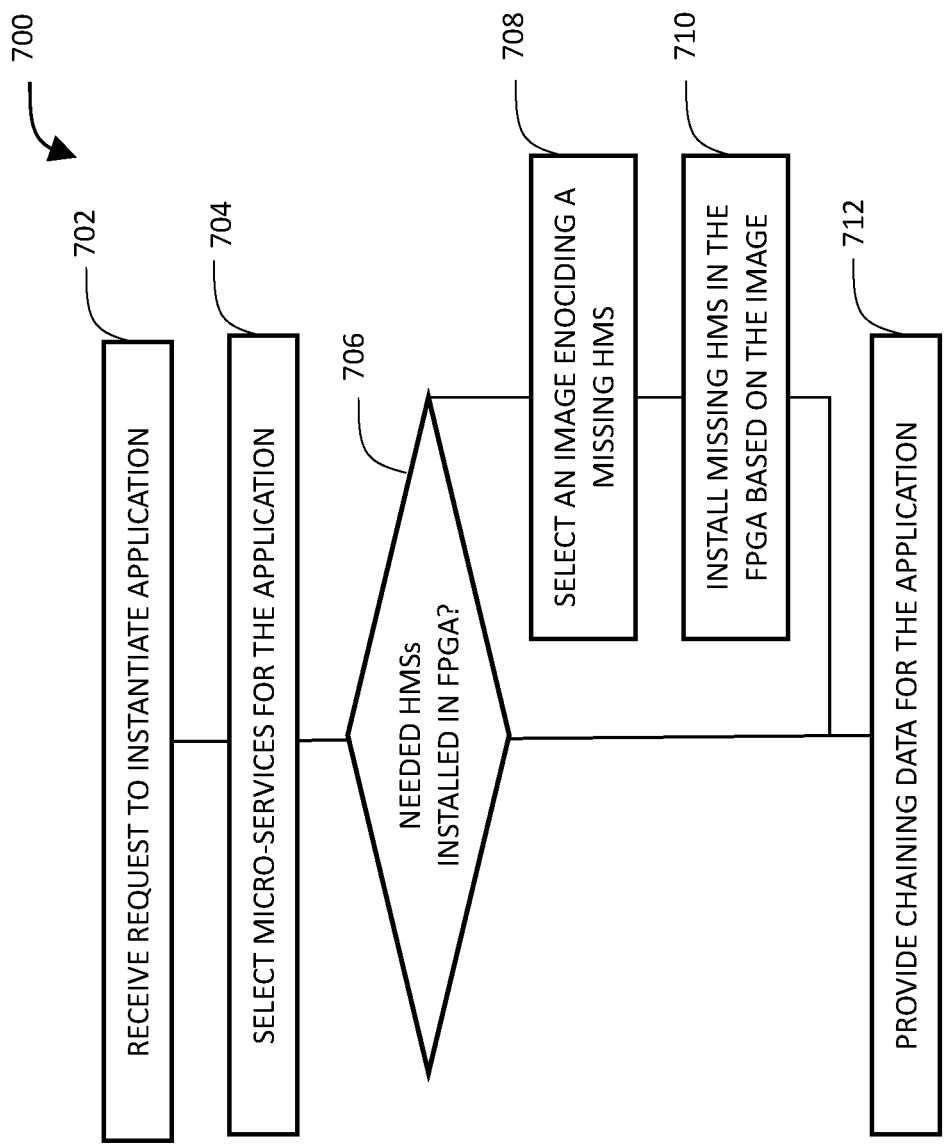
FIG. 7 shows a flowchart showing a micro-service allocation process in accordance with an embodiment of the disclosure.

Reference is made to FIG. 7. In an embodiment of the disclosure, orchestration system 600 maintains an inventory of available micro-services, including available HMSs previously loaded onto the HMS-FPGA available to be loaded onto the HMS-FPGA via partial reconfiguration. The inventory may further include available SMSs. In response to receiving a request for instantiating a given macro-service, the orchestration system may perform a micro-service selection process 700 comprising one or more of the following blocks: receive a request to instantiate an application (block 702); select micro-services needed for instantiating the application (block 704), optionally selecting a hardware or software version of the micro-service based on resource availability or computational requirements; determine, based on the loaded HMS inventory, whether needed HMSs are already loaded on the FPGA (block 706) and, if a needed HMS has not yet been loaded, select an appropriate image to be retrieved from HMS image repository 500 (block 708) and initiate installation of the missing HMS in the HMS-FPGA via partial reconfiguration based on the selected image (710); and provide chaining data for the application (712), comprising updating a forwarding table of the GP-NoC and/or preparing a label, an address or and address stack for insertion into information packets. Optionally, orchestration system 600 comprises a processor (not shown) and a memory (not shown), the memory comprising a set of instructions that is executable by the processor to perform functions of the orchestration system as described hereinabove, including but not limited to micro-service selection process 700.

Resources on the FPGA may initially be separated into some number of discrete areas (the sizing of which may be optimized from the point of memory and logic elements) and the orchestration system will place HMSs into one of these areas. In some embodiments the orchestration system may merge several such areas into a single larger area in order to support a larger HMS.

There is therefore provided in accordance with an embodiment of the disclosure, a device comprising: at least one partially reconfigurable FPGA; a Network-on-Chip (NoC) comprised in the FPGA; and at least one area on the at least one FPGA operable to house a hardware micro-service (HMS); wherein an HMS image may be loaded onto the area of the at least one FPGA via partial reconfiguration to form a new HMS, and the NoC is operable to forward information to and from the new HMS without the NoC being reloaded. Optionally, the image is stored in an HMS image repository that stores a plurality of images any one of which may be loaded on demand onto a portion of the at least one FPGA via partial reconfiguration.

In an embodiment of the disclosure an FPGA may be provided with the NoC statically installed, thus obviating the need to preload it before loading any hardware micro-services. Such pre-installation is sometimes called "hardening", the NoC may be called a hard-NoC, and the resulting chip is a hybrid between FPGA and Application Specific Integrated Circuit (ASIC) technologies.

In an embodiment of the disclosure, the at least one FPGA is operable to implement at least one application, an application being characterized by an ordered sequence of micro-services comprising at least one HMS loaded onto the FPGA. Optionally, the at least one FPGA is operable to implement a plurality of applications at the same time, wherein instantiating a new application does not interrupt operation of existing applications. Optionally, the device functioning in accordance with the application functions as a networking appliance.

In an embodiment of the disclosure, at least one of the HMSs loaded onto the FPGA is a soft CPU capable of running arbitrary software, the object code of which may reside in memory on the FPGA, or in external memory.

In an embodiment of the disclosure, the NoC comprises a packet forwarding device that is operable to forward an information packet to the new HMS responsive to a field comprised in the information packet and/or a forwarding table stored in a memory comprised in the NoC. Optionally, the packet forwarding device is operable to forward an information packet responsive to an application label comprised in the information packet and an input address from which the NoC received the information packet. Optionally, the packet forwarding device is operable to forward an information packet responsive to an address stack comprised in the information packet, wherein the address stack comprises a sequence of addresses defining a sequence of HMSs. Optionally, at least one HMS loaded onto the FPGA is operable to add, to the information packet, a next hop identifier corresponding to another HMS, and the packet forwarding device is operable to forward the information packet to the other HMS responsive to the next hop identifier.

Optionally, at least one FPGA comprises a plurality of instances of a same HMS, and the NoC is programmed to anycast a packet to one of the HMS instances responsive to a current load of the HMS instances.

There is also provided in an embodiment of the disclosure micro-service orchestration system for instantiating applications using a partially reconfigurable FPGA installed with a Network-on-Chip (NoC), the orchestration system comprising: a processor; a memory; and a set of instructions stored in the memory and executable by the processor to: receive a request to instantiate an application; select a plurality of micro-services required for the application; initiate installation of a new hardware micro-service (HMS) onto the FPGA via partial reconfiguration to provide at least one micro-service comprised in the plurality of micro-services; and provide chaining data usable by the NoC to forward an information packet associated with the requested application to the new HMS. Optionally, the chaining data comprises a label or an address that is inserted into the information packet, wherein the label or address is associated with the new HMS. Optionally, the chaining data is contained in at least one forwarding table entry that is added to a forwarding table of the NoC.

In an embodiment of the disclosure, the plurality of micro-services comprises at least one HMS installed in the FPGA and at least one software micro-service (SMS) that is run in a CPU operatively connected to the FPGA; and the chaining data is usable to forward the information packet from the at least one HMS to the at least one SMS or from the at least one SMS to the at least one HMS.

In an embodiment of the disclosure, the plurality of micro-services comprises a first HMS installed in the FPGA and a second HMS installed in another FPGA; and the chaining data is usable to forward the information packet between the first and second HMSs.

In an embodiment of the disclosure, a micro-service may performed by an HMS installed in the FPGA or by an SMS installed on a CPU; and the orchestration system is configured to select the HMS or the SMS as a selected micro-service responsive to at least one resource parameter and generate chaining data for directing an information packet to the selected micro-service. Optionally, the resource parameter comprises a computational resource availability of the FPGA and/or a computational power requirement of the application.

There is also provided in an embodiment of the disclosure a method, optionally executed by an orchestration system, for instantiating applications implemented via hardware micro-services in a partially reconfigurable FPGA installed with a Network-on-Chip (NoC), the method comprising: receiving a request to instantiate an application; selecting a plurality of micro-services required for the application; initiating installation of a new hardware micro-service (HMS) onto an FPGA via partial reconfiguration to provide at least one micro-service comprised in the plurality of micro-services; and providing chaining data usable by the packet forwarding device comprised in the NoC to forward an information packet associated with the application to the new HMS. Optionally, the new HMS is a soft CPU, and the method further comprises selecting a downloading object code for the soft CPU to a memory, which is optionally located in the FPGA or located external to and operatively connected to the FPGA.

In the description and claims of the present application, each of the verbs, "comprise," "include" and "have," and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A device comprising:
   at least one partially reconfigurable FPGA;
   a Network-on-Chip (NoC) comprised in the FPGA; and
   at least one area on the at least one FPGA operable to house a hardware micro-service (HMS), so that an HMS image may be loaded onto the area of the at least one FPGA via partial reconfiguration to form a new HMS; and
   the NoC is operable to forward information to and from the new HMS without the NoC being reloaded, wherein
   the NoC comprises a packet forwarding device that is operable to forward an information packet responsive to one or more of:
      a field comprised in the information packet and a forwarding table stored in a memory comprised in the NoC;
      an application label comprised in the information packet and an input address from which the NoC received the information packet; or
      an address stack comprised in the information packet, wherein the address stack comprises a sequence of addresses defining a sequence of HMSs.

2. The device according to claim 1, wherein the at least one FPGA is operable to implement at least one application, an application being characterized by an ordered sequence of micro-services comprising at least one HMS loaded onto the at least one FPGA.

3. The device according to claim 2, wherein the at least one FPGA is operable to implement a plurality of applications at the same time, wherein instantiating a new application does not interrupt operation of existing applications.

4. The device according to claim 1, wherein the image is stored in an HMS image repository that stores a plurality of images any one of which may be loaded on demand onto a portion of the at least one FPGA via partial reconfiguration.

5. The device according to claim 2, wherein the device functioning in accordance with the application functions as a networking appliance.

6. The device according to claim 1 in which at least one of the HMSs loaded onto the at least one FPGA is a soft CPU.

7. The device according to claim 1, wherein at least one HMS loaded onto the at least one FPGA is operable to add, to the information packet, a next hop identifier corresponding to another HMS, and the packet forwarding device is operable to forward the information packet to the other HMS responsive to the next hop identifier.

8. The device according to claim 1, wherein the at least one FPGA comprises a plurality of instances of a same HMS, and the NoC is programmed to anycast a packet to one of the HMS instances responsive to a current load of the HMS instances.

9. A micro-service orchestration system for instantiating applications using a partially reconfigurable FPGA installed with a Network-on-Chip (NoC), the orchestration system comprising:
   a processor;
   a memory; and
   a set of instructions stored in the memory and executable by the processor to:
      receive a request to instantiate an application;
      select a plurality of micro-services required for instantiating the application, of which at least one is a hardware micro-service (HMS) that is designated to be installed in an FPGA;
      initiate installation of the HMS onto the FPGA via partial reconfiguration; and
      provide chaining data that defines a sequence by which an information packet associated with the application is processed by the plurality of micro-services, and is usable by the NoC to forward the information packet to the HMS.

10. The orchestration system according to claim 9, wherein the chaining data comprises a label or an address that is inserted into the information packet, wherein the label or address is associated with the new HMS.

11. The orchestration system according to claim 9, wherein the chaining data is contained in at least one forwarding table entry that is added to a forwarding table of the NoC.

12. The orchestration system according to claim 9, wherein:
   the plurality of micro-services comprises at least one HMS installed in the FPGA and at least one software micro-service (SMS) that is run in a CPU operatively connected to the FPGA; and
   the chaining data is usable to forward the information packet from the at least one HMS to the at least one SMS or from the at least one SMS to the at least one HMS.

13. The orchestration system according to claim 9, wherein:
   the plurality of micro-services comprises a first HMS installed in the FPGA and a second HMS installed in another FPGA; and
   the chaining data is usable to forward the information packet between the first and second HMSs.

14. The orchestration system according to claim 9, wherein:
   a micro-service may be performed by an HMS installed in the FPGA or by an SMS installed on a CPU; and
   the orchestration system is configured to select the HMS or the SMS as a selected micro-service responsive to at least one resource parameter and generate chaining data for directing an information packet to the selected micro-service.

15. The orchestration system according to claim 14, wherein the at least one resource parameter comprises a computational resource availability of the FPGA and/or a computational power requirement of the application.

16. A method for instantiating applications implemented via hardware micro-services in a partially reconfigurable FPGA installed with a Network-on-Chip (NoC), the method comprising:
- receiving a request to instantiate an application;
- selecting a plurality of micro-services required for instantiating the application, of which at least one is a hardware micro-service (HMS) that is designated to be installed in an FPGA;
- initiating installation of the HMS onto the FPGA via partial reconfiguration; and
- providing chaining data that defines a sequence by which an information packet associated with the application is processed by the plurality of micro-services, and is usable by the packet forwarding device comprised in the NoC to forward the information packet to the new HMS.

17. The method according to claim 16 executed by an orchestration system.

* * * * *